United States Patent
Samson et al.

(10) Patent No.: US 6,407,853 B1
(45) Date of Patent: Jun. 18, 2002

(54) BROADHEAD DUAL WAVELENGTH PUMPED FIBER AMPLIFIER

(75) Inventors: Bryce Samson, Horseheads; Bruce Aitken, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/430,446

(22) Filed: Dec. 14, 1999

(51) Int. Cl.[7] .............................. G02B 6/42; H01S 3/00
(52) U.S. Cl. .................. 359/341.31; 359/134; 359/337; 359/345; 372/70
(58) Field of Search ................................. 359/134, 160, 359/337, 341, 343, 345, 341.31; 372/6, 40, 70

(56) References Cited

U.S. PATENT DOCUMENTS

| | | | | |
|---|---|---|---|---|
| 4,004,250 A | * | 1/1977 | Krupke | 372/70 |
| 5,008,890 A | * | 4/1991 | McFarlane | 372/70 |
| 5,119,230 A | * | 6/1992 | Pfeiffer | 359/341 |
| 5,140,456 A | * | 8/1992 | Huber | 399/341 |
| 5,247,529 A | * | 9/1993 | Heidemann | 372/6 |
| 5,287,216 A | * | 2/1994 | Chirravuri et al. | 359/341 |
| 5,295,205 A | | 3/1994 | Miller et al. | |
| 5,351,325 A | | 9/1994 | Miler et al. | |
| 5,400,417 A | | 3/1995 | Allie et al. | |
| 5,500,764 A | * | 3/1996 | Armitage et al. | 359/341 |
| 5,539,758 A | * | 7/1996 | Dennis | 372/6 |
| 5,557,442 A | | 9/1996 | Huber | |
| 5,933,437 A | * | 8/1999 | Delavaux | 322/6 |
| 6,115,174 A | * | 9/2000 | Grubb et al. | 359/344 |

OTHER PUBLICATIONS

Quinby et al., IEEE Photonics Tech. Lett. vol. 11, #3, pp. 313–315; abstract only herewith, Mar. 1999.*
Pawlowski et al. "Variable bandwidth and tunable centre frequency filter using transversal–form programmable optical filter", Electronics Letters, Jan. 18, 1996, vol. 32, No. 2, pp. 113–114.
Kasamatsu et al. "Novel 1.50–$\mu$m Band Gain–Shifted Thulium–Doped Fiber Amplifier by using Dual Wavelength Pumping of 1.05 $\mu$m and 1.56 $\mu$m", Proc Optical Amplifiers and their Applications, Nara, Japan, Jul. 1999, post deadline paper PdP1–PDP1–4.

* cited by examiner

Primary Examiner—Nelson Moskowitz
(74) Attorney, Agent, or Firm—Svetlana Short

(57) ABSTRACT

The dual wavelength pumping scheme controls the relative population of the termination state vis-a-vis the metastable state. Praseodymium doped chalcogenide glass and a variety of thulium doped glasses are described as examples. The relative pump powers or wavelengths may be adjusted to control the gain spectrum of the amplifier, making the amplifier useful in a variety of different optical systems including wavelength division multiplexed systems.

30 Claims, 10 Drawing Sheets

BROADHEAD DUAL WAVELENGTH PUMPED FIBER AMPLIFIER

This application relates to a PCT application Ser. No. PCT/US99/0263 filed on Feb. 9, 1999, which is based upon a U.S. provisional application Ser. No. 60/080128 filed Mar. 31, 1998, entitled Optical Amplifier With Wide Flat Gain Dynamic Range in the name of Michael Yadlowsky.

BACKGROUND OF THE INVENTION

1. Field of the Invention

The present invention relates generally to optical amplifiers. More particularly, the invention relates to an optical amplifier employing dual wavelength pumping to reduce the steady state population in the intermediate termination energy level by repopulating the metastable energy level. The power and/or wavelength of the second pump may be adjusted to alter the shape of the amplifier gain spectrum.

2. Technical Background

Optical amplifiers increase the amplitude of an optical wave through a process known as stimulated emission in which a photon, supplied as the input signal, induces higher energy level electrons within an optical material to undergo a transition to a lower energy level. In the process, the material emits a photon with the same frequency, direction and polarization as the initial photon. These two photons can, in turn, serve to stimulate the emission of two additional photons, and so forth. The result is coherent light amplification. Stimulated emission occurs when the photon energy is nearly equal to the atomic transition energy difference. For this reason, the process produces amplification in one or more bands of frequencies determined by the atomic line width.

While there are a number of different optical amplifier configurations in use today, the optical fiber configuration is quite popular, particularly for optical communications applications. The optical fiber amplifier typically consists of an optical material such as glass, combined with a rare earth dopant and configured as an optical waveguide. Rare-earth-doped silica fibers are popular today, in part because they offer the advantages of single-mode guided wave optics. Optical fiber amplifiers can be made to operate over a broad range of wavelengths, dictated by the atomic properties of the host and rare earth dopant.

The phenomenal growth in communication technology and information technology has fueled considerable interest in finding new optical fiber materials that will increase signal channel bandwidth and allow engineers to exploit new frequency bands.

One difficulty encountered in the rare-earth materials has to do with the materials' inherent low multi-phonon decay rates. It is desirable to have a long lifetime in the metastable energy level because it aids stimulated emission. However, it can be undesirable if the particular material exhibits a similarly long lifetime in an intermediate termination energy level.

By way of example, Praseodymium doped chalcogenide glass possesses a $^1G_4$ (metastable energy level) lifetime of around 300 $\mu$s with a radiative quantum efficiency of greater than 50% typically. However, a further consequence of this low multi-phonon decay rate is the relatively long lifetime for the $^3H_5$ energy level (the intermediate termination energy level for the 1.3 $\mu$m transition). A typical value for the lifetime of the $^3H_5$ energy level is in the range of 100 $\mu$s in chalcogenide glasses.

In an optical amplifier fabricated from this material, pump energy supplied at 1020 nm excites atoms in the material from the $^3H_4$ ground energy state to the $^1G_4$ metastable state. The input optical signal interacts with the material in this excited state to produce photons by stimulated emission, and thereby causing electrons in the metastable state to fall to an intermediate termination energy level of $^3H_5$. While the electrons are in the intermediate $^3H_5$ energy level, they are no longer available for use. Only after they decay back to the ground energy level $^3H_4$ can they be re-pumped to the metastable energy level $^1G_4$ where they can take part in further stimulated emission processes.

Thus, the long $^3H_5$ energy level lifetime has a detrimental effect when the material is used as a fiber amplifier. The $^3H_5$ population lowers the gain efficiency of the amplifier and tends to shift the peak operating wavelength away from the desired wavelength.

The aforementioned difficulty is not unique to Praseodymium ($Pr^{3+}$) doped chalcogenide glass; rather, it exists in other low and intermediate phonon energy glasses as well, including any one from chalcogenide, halide, tellurite, germanate, aluminate and gallate glass fibers doped with either Thulium ($Tm^{3+}$) or Holmium ($Ho^{3+}$).

SUMMARY OF THE INVENTION

It is an object of the present invention to provide an optical amplifier and a pumping technique that overcomes the difficulties associated with long intermediate termination energy level lifetimes exhibited by certain rare earth doped materials.

According to one aspect of the invention, the optical amplifier comprises an optical waveguide having an optical host that contains a rare earth dopant. The host and dopant define a ground energy state. The amplifier further includes a first pump optically coupled to the waveguide. This first pump supplies optical energy into the waveguide at a first wavelength. The first pump establishes a metastable energy state above the ground energy state. An input, coupled to the optical waveguide, introduces an optical signal to be amplified, where amplification is produced by stimulated emission of photons from the metastable energy state. This establishes a termination energy state below the first metastable energy state and above the ground energy state. The optical amplifier further comprises a second pump optically coupled to the waveguide that supplies optical energy to the waveguide at a second wavelength. The second pump repopulates the first metastable energy state by depopulating the termination energy state.

The resulting optical amplifier configuration is suitable for use with a number of different optical fiber materials, including Praseodymium doped chalcogenide glass fibers, and in particular sulfide glasses, Thulium or Holmium doped glasses such as chalcogenides, halides, tellurites, germanates, aluminates and gallates.

For a more complete understanding of the invention, its objects and advantages, refer to the following specification and to the accompanying drawings. Additional features and advantages of the invention are set forth in the detailed description which follows.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

We have discovered that a dual pumping technique, (described in detail below) overcomes difficulty associated with long intermediate energy level lifetimes exhibited by certain rare earth doped material. According to an embodiment of the present invention, this technique employs a first pump at the primary operating wavelength, and second pump operating at a wavelength designed to reduce the steady state population in the intermediate termination energy level while simultaneously repopulating the metastable energy level. We have also discovered that the relative optical powers and/or wavelengths of the two pumps can be controlled to enhance the amplifier characteristics, giving the technique an important additional benefit.

Figure 1:
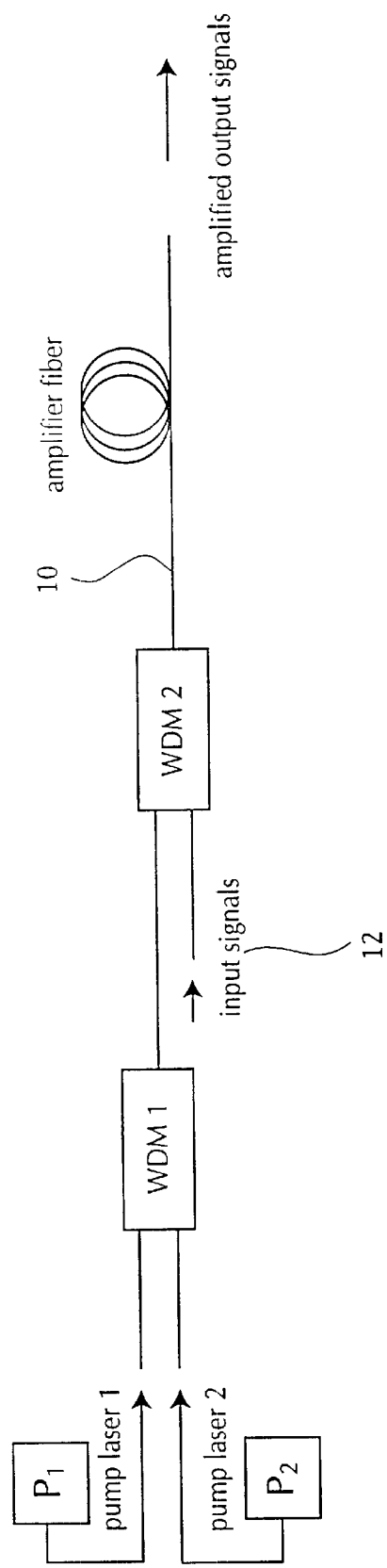
FIG. 1 is a schematic diagram illustrating the dual wavelength pumped optical amplifier.

Referring to FIG. 1, an exemplary embodiment of the optical amplifier is illustrated. The preferred embodiment employs an optical waveguide 10, which may be, for example, an optical fiber cable having an inner core of a first optical material and an outer cladding of a different material. The materials used for the inner core and outer cladding have different indices of refraction so that optical energy reflects at the inner core-outer cladding interface thereby permitting the energy to propate through the waveguide.

As will be more fully explained below, the optical waveguide comprises a host material, preferably of glass, that contains a rare earth dopant. A variety of different optical materials and rare earth dopants may be used for this purpose. Several examples are discussed below, and other examples and materials will be apparent to those having skill in the art.

The optical amplifier has a first pump $P_1$ that serves as the primary pump, used to excite a population of rare earth ions within the optical material, raising them from their ground energy state to a metastable energy state. The metastable energy state is characterized by a comparatively long fluorescence lifetime, usually greater than 50 microseconds. In other words, ions raised to the metastable energy state remain in that state for a sufficient time enabling stimulated emission. The amplifier includes an input port 12 into which an optical input signal may be introduced. Input port 12 couples the input optical signal into the optical waveguide 10 whereby amplification is produced by stimulated emission of photons from the metastable energy state.

As will be more fully explained in the examples presented below, the optical materials used to implement the optical waveguide exhibit the property that excited ions decaying from the metastable state fall to a termination energy state as a consequence of being used in the amplification process. The termination energy state is below the metastable energy state, but above the ground energy state, usually referred to as a 4 level transition. Ions in this termination energy state ultimately decay to the ground energy state after some decay time dictated by the composition of the optical material, and strongly dependant on the phonon energy of the host material.

Although the active ions ultimately will decay from the termination energy state to the ground energy state, the finite time during which they occupy the termination energy state significantly affects the amplifier performance. They may contribute to a decrease in the overall amplifier efficiency since ions in the termination level now contribute a loss at the signal wavelength. This loss may in turn shift the operating wavelength of the amplifier considerably (see FIGS. 6 and 10, for example) and adversely affect the noise figure of the amplifier. In most cases the active ion population in the intermediate termination energy level is unaffected by the wavelength of the pump $P_1$. The lifetime of the intermediate termination level being dominated by the fluorescence lifetime for the active ion in the relevant host glass.

To address this problem, the optical amplifier includes a second pump $P_2$. The second pump $P_2$ is specifically selected to operate at a wavelength that acts upon electrons in the intermediate termination energy level, raising them to the metastable energy level, perhaps via an upper lying energy level, where they can contribute, once again, to the amplification process.

Thus the optical amplifier employs a dual wavelength pump configuration in which the operating wavelength and power of each pump unit is designed to control the relative populations of active ions within both the metastable and termination energy levels. Primary pump $P_1$ affects the ground energy state population; whereas, second pump $P_2$ affects the intermediate termination energy state population.

As previously stated, the invention can be implemented using a variety of different optical materials. In general, the dual pump optical amplifier is most effective with optical materials that have a termination energy state above the ground energy state (so called 4 level systems) with a comparatively long lifetime (e.g. approximately the same order of magnitude as the lifetime of the metastable energy state).

The dual wavelength pump configuration offers a great deal of flexibility in controlling the operating wavelength and bandwidth of the amplifier. By controlling the relative powers and/or wavelengths of the respective pumps, the respective populations within the metastable and termination energy states can be controlled, thereby changing the operating parameters of the amplifier. Most importantly this allows a much greater degree of flexibility in the amplifier operating characteristics after the amplifier unit has been constructed. Important in WDM applications where the effect of adding and dropping channels on the amplifier may be compensated by the control of pumps $P_1$ and $P_2$.

The following will present several examples of the dual wavelength pumped amplifier in use.

Figure 2:
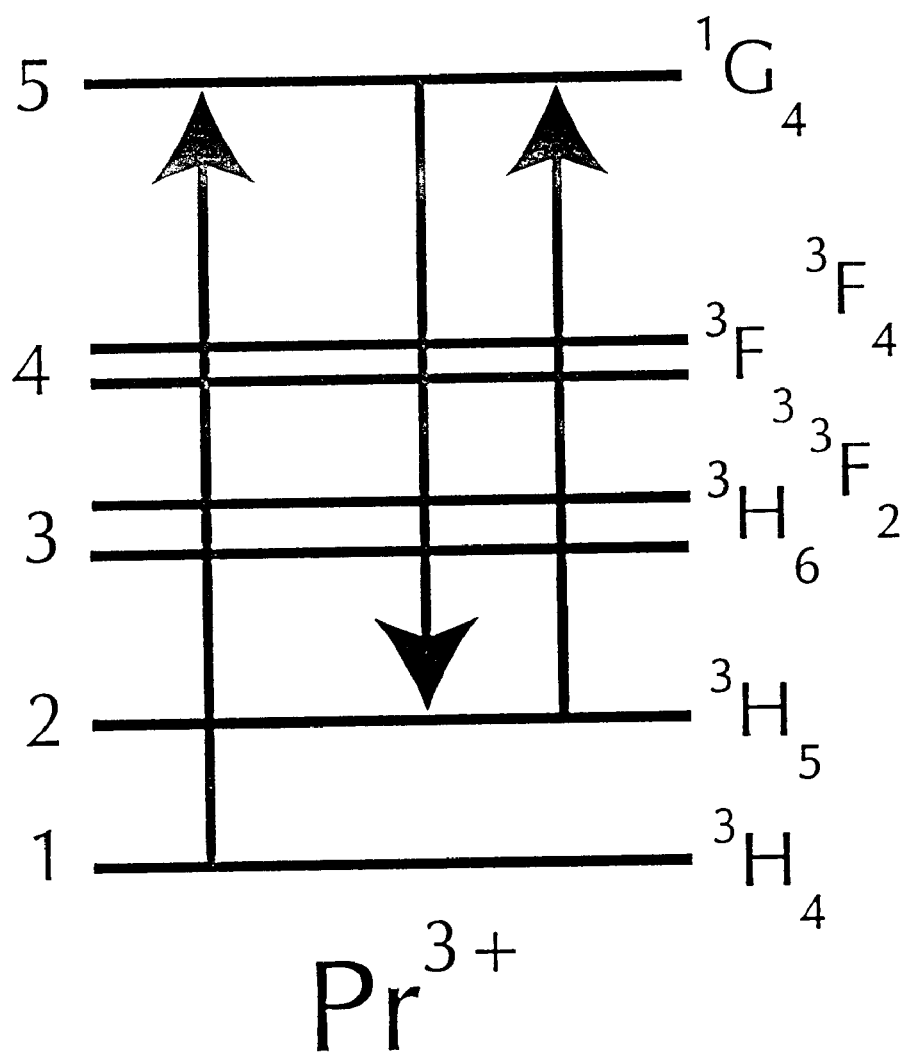
FIG. 2 is an energy state diagram for an exemplary embodiment of the invention employing Praseodymium doped chalcogenide glass.

EXAMPLE 1
Dual Wavelength Pumped Praseodymium Doped Chalcogenide Glass Fiber Amplifier This example is implemented using a Praseodymium doped chalcogenide glass fiber to fabricate the optical waveguide 10. FIG. 2 shows the energy level system for this optical material. The ground energy state $^3H_4$ is designated as level 1. The metastable state $^1G_4$ is designated level 5, and the termination energy state $^3H_5$ is designated level 2.

In this embodiment pump $P_1$ operates at a wavelength around 1020 nm, which serves to pump electrons from the ground state to the metastable state $^1G_4$. The fiber amplifier utilizes the $^1G_4$–$^3H_5$ transition, which corresponds to the telecommunications window centered about 1300 nm, that is present in the currently installed telecommunications fiber base. Thus this embodiment is readily applicable in present day optical fiber systems.

In low phonon energy glasses, such as chalcogenide, and in particular sulfide glasses, the $^1G_4$ lifetime is around 300 $\mu$s with a radiative quantum efficiency of greater than 50% typically. Quantum efficiency is defined as the ratio of light out (measured in numbers of photons) vs the light in. For example, in this case we are measuring the ratio of pumped photons to emitted photons. A consequence of the low multiphonon decay rates in these glass systems is the relatively long lifetime for the $^3H_5$ energy level. A typical value for the lifetime of the $^3H_5$ energy level in sulfide glasses is in the range of 100 $\mu$s.

Figure 3:
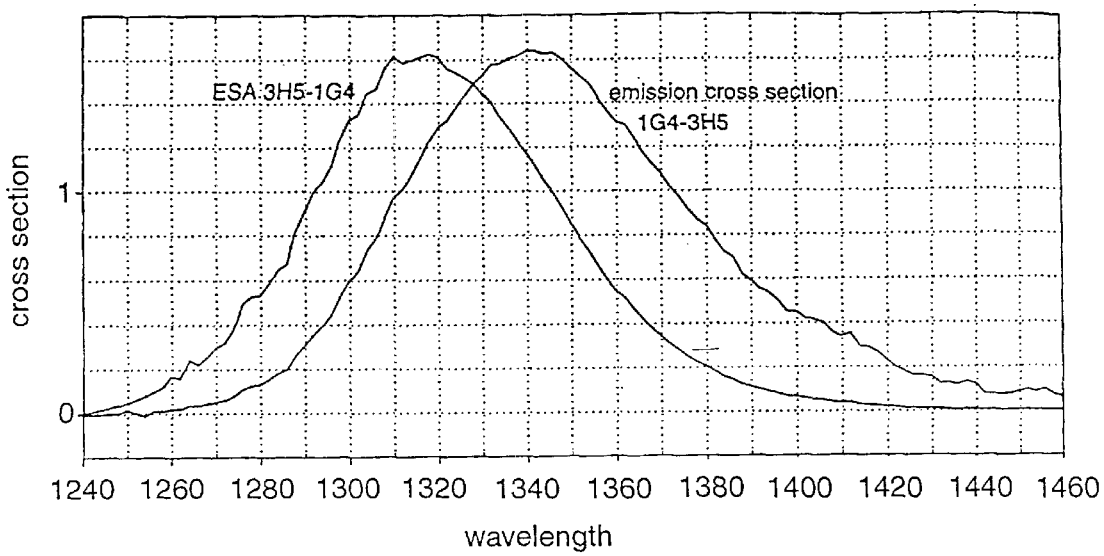
FIG. 3 is a graph comparing the $^1G_4$–$^3H_5$ emission cross section with the excited state absorption (ESA) cross section from the $^3H_5$ termination energy state.
Figure 4:
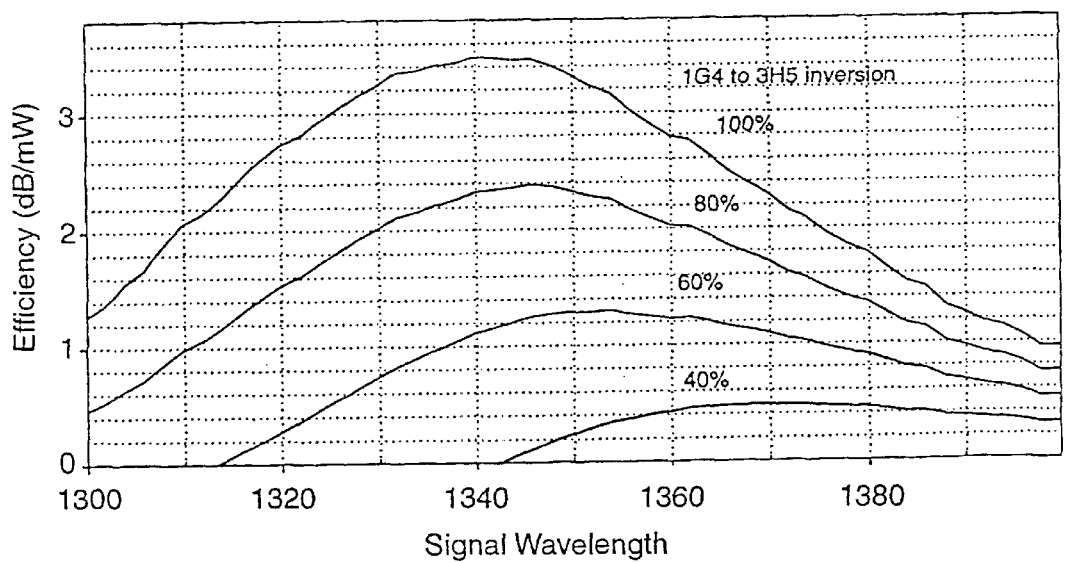
FIG. 4 is a family of curves plotting amplifier efficiency as a function of signal wavelength, illustrating the resultant effect of varying the $^3H_5$ level population on amplifier gain curve and efficiency.

The long $^3H_5$ lifetime has a detrimental effect when these glasses are used as a fiber amplifier. The $^1G_4$–$^3H_5$ emission cross section, along with the excited state absorption (ESA) cross section from $^3H_5$ to $^1G_4$ are shown in FIG. 3. The resultant effect of varying the $^3H_5$ level population on the amplifier gain curve and efficiency is shown in FIG. 4. (it is noted that inversion is the ratio of number of ions in the $^1G_4$ level to that in $^3H_5$. The exact $^3H_5$ level population will depend strongly on the amplifier operating conditions, but the net effect of an increasing $^3H_5$ population is lower gain efficiency (dB/mW) along with a shifting of the peak operating wavelength to longer wavelengths.

Both of these effects are detrimental to the usefulness of the amplifier, since the peak operating (i.e. signal) wavelength should ideally be as close to 1300 nm as possible.

Figure 5:
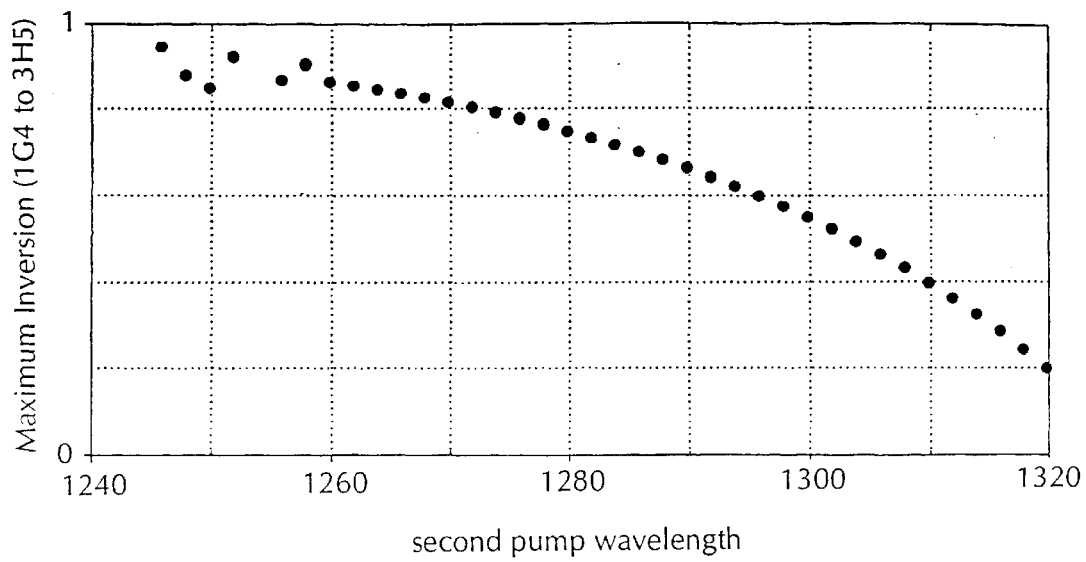
FIG. 5 is a graph of maximum $^1G_4$–$^3H_5$ inversion versus pumping wavelength, useful in determining the optimum second pump wavelength of the Praseodymium doped chalcogenide glass fiber example.

Adding the second pump $P_2$ rectifies the above problem by pumping the $^3H_5$ population back to the $^1G_4$ metastable state. An indication of the optimum second pump wavelength is shown in FIG. 5, where we plot the maximum $^1G_4$ to $^3H_5$ inversion versus the second pump wavelength. In order to achieve high $^1G_4$ to $^3H_5$ population inversions (i.e., greater than 80%) the pump wavelength should be around 1280 nm or less. This is a convenient wavelength for direct pumping by semiconductor lasers.

Figure 6:
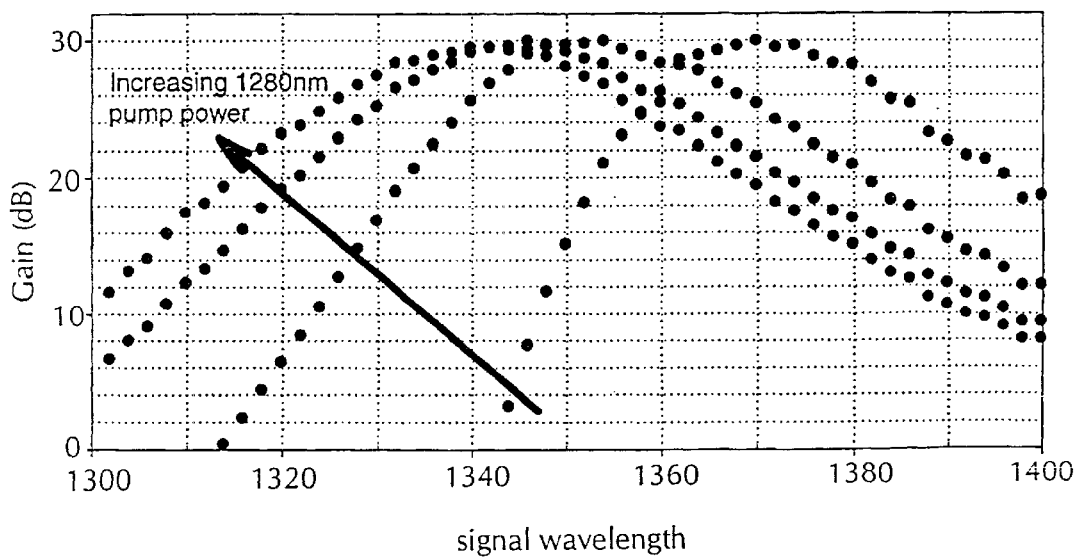
FIG. 6 is a family of curves graphing amplifier gain as a function of signal wavelength, useful in understanding the effect of altering pump power to change the operating bandwidth of the amplifier.

Examples of the expected gain curves for amplifiers operating under different conditions are shown in FIG. 6. By simply changing the second pump laser power or wavelength, and hence the $^3H_5$ level population, we can easily alter the amplifier gain spectrum.

FIG. 6 thus demonstrates that we can use this second pump $P_2$ to control the shape of the amplifier gain spectrum. It may also be used to extend the useful operating wavelengths of the optical amplifier, by simply utilizing sections of fiber with different 1280 nm pump rates. Furthermore, the dual pump configuration gives the ability to change magnitude of the amplifier gain curve with a fixed gain shape, by changing the ratio of the first and second pump powers. As such, the dual pump optical amplifier is well suited to perform tilt free amplifier functions (i.e., a substantially same gain across the wavelength range of the amplifier), for example as in wavelength division multiplexed (WDM) systems. That is changes in amplifier gain shape, caused by the adding or dropping of channels (and thus changes in the number of signal wavelengths), may be compensated for by simply changing the relative powers or wavelengths of the pump units $P_1$ and $P_2$.

EXAMPLE 2
Broadband Thulium Doped Amplifier Operating Around 1500 nm

This embodiment utilizes a thulium doped fiber amplifier. The primary pump source wavelength may be around 800 nm other pump wavelengths may also be used. This pump source pumps ions and populates the $^3H_4$ metastable energy level from the ground state ($^3H_6$). Amplification is achieved on the transition from the $^3H_4$ to $^3F_4$ energy level at wavelengths around 1500 nm (see FIG. 10). Due to the long fluorescence lifetime for the $^3F_4$ energy level a significant percentage of thulium ions will be in this excited state. A second pump $P_2$ operating around 1440 nm is used to control the relative $^3H_4$ to $^3F_4$ electron population. By suitable choice of the relative pump powers and wavelengths, and hence the relative populations, a broad and flat gain spectrum is achieved with this amplifier.

In the specific example described, a multi-component germanate glass fiber amplifier with a 40 nm wide gain spectrum, centered at 1500 nm, is implemented. However the invention may be applied to a number of low/intermediate phonon energy glasses. By careful choice of pump rates a flat gain spectrum with around 2 dB ripple for 30 dB peak gain is possible. This embodiment also has applications in WDM systems.

Figure 7:
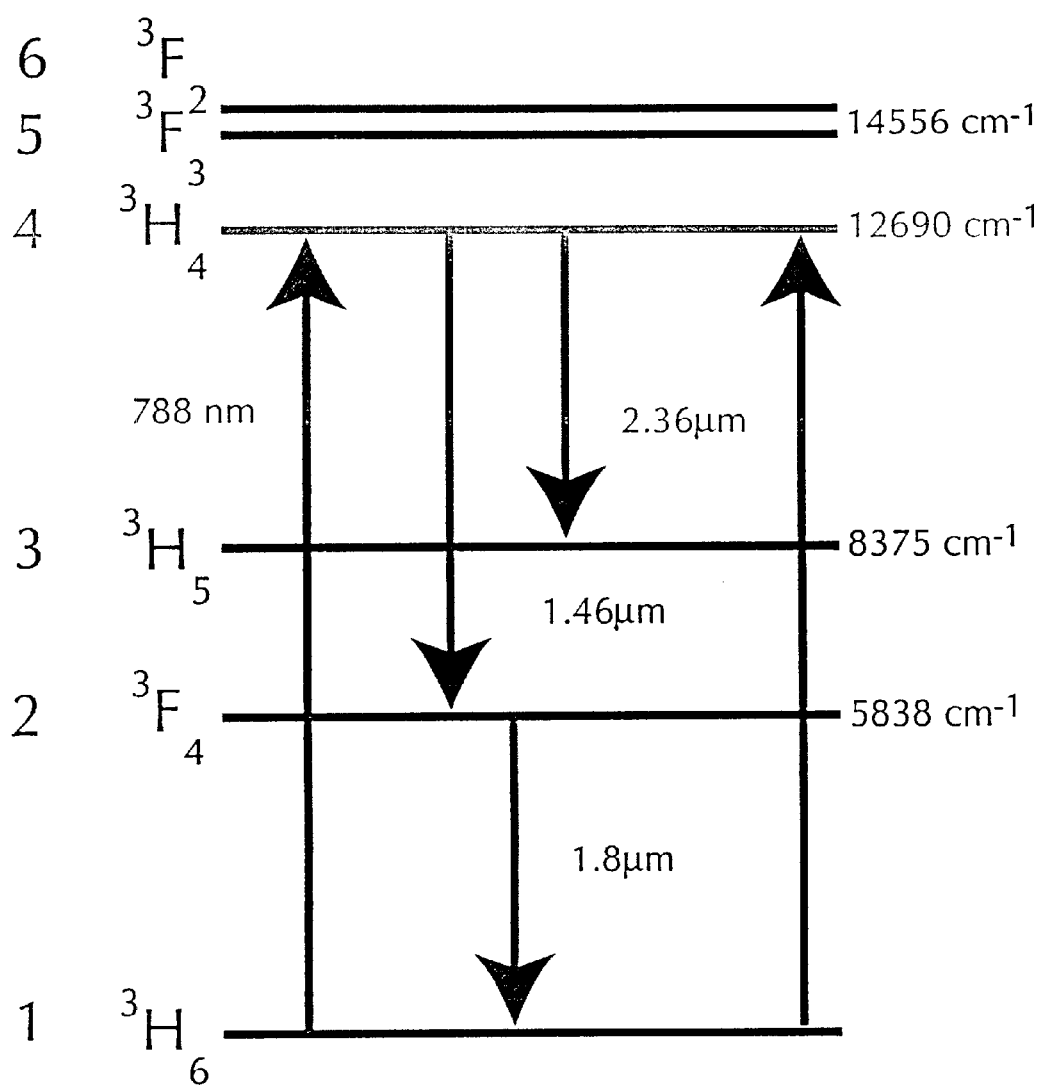
FIG. 7 is an energy level diagram for a second exemplary embodiment employing Thulium-doped glasses.
Figure 8:
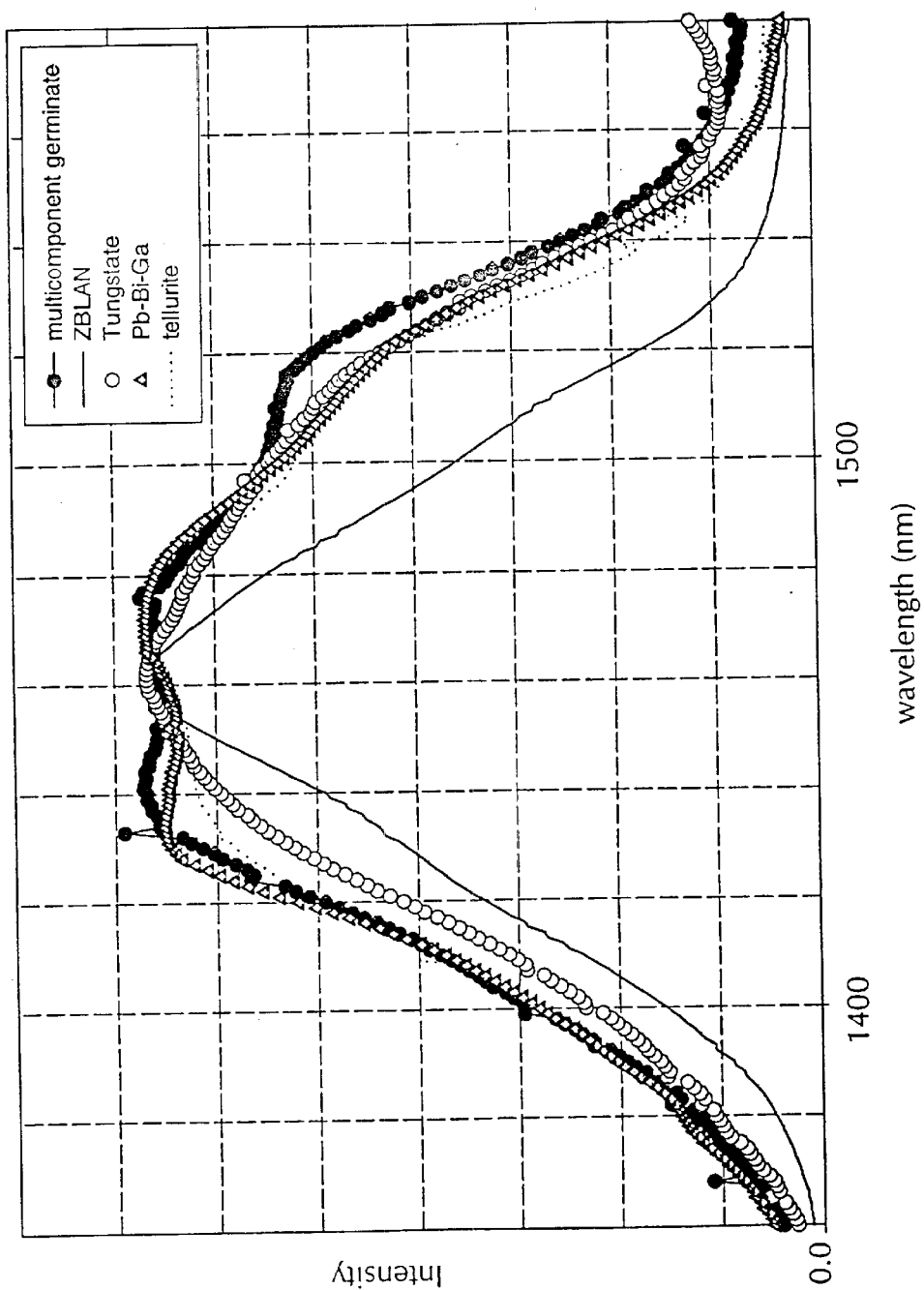
FIG. 8 is a series of waveform diagrams comparing the intensity as a function of wavelength for various low phonon energy glasses.

The energy level system for the thulium doped glass is shown in FIG. 7. There is a considerable body of work in the literature investigating the potential for making a thulium fiber amplifier operating on the $^3H_4$–$^3F_4$ transition. Most have concentrated on the glass system known as ZBLAN. Efficient amplification on this transition is frustrated by the long lifetime for the termination level ($^3F_4$) compared to the metastable level ($^3H_4$). Examples of fluorescent lifetimes for a number of thulium doped glass is given in table 1 along with examples of the fluorescence spectra in FIG. 8. In all cases the $^3H_4$ level lifetime is less than that of the $^3F_4$ energy level and a fiber amplifier made from any of these glasses will suffer from the same problem.

TABLE 1

| Glass | Maximum phonon energy (cm$^{-1}$) | 3H4 lifetime (msec) | 3F4 lifetime (msec) |
|---|---|---|---|
| Germanate | 900 | 0.30 | 3.0 |
| Tellurite | 800 | 0.25 | 2.2 |
| Fluoride | 600 | 1.0 | 6.0 |
| Aluminate | 800 | 0.3 | 4.0 |
| Sulphide | 450 | 0.10 | 1.0 |

As a consequence of these lifetimes when operating as a optical fiber amplifier, the steady state 3H$_4$ level population when pumped at 800 nm will be less than that of the 3F4 level. Prior attempts to address this issue have involved reducing the steady state $^3F_4$ level population either by up-conversion pumping, defined as pumping ions from an excited state to a higher (i.e., more energetic) level, at 1064 nm or co-doping with other rare earth ions. Both of these schemes have significant drawbacks.

Figure 9:
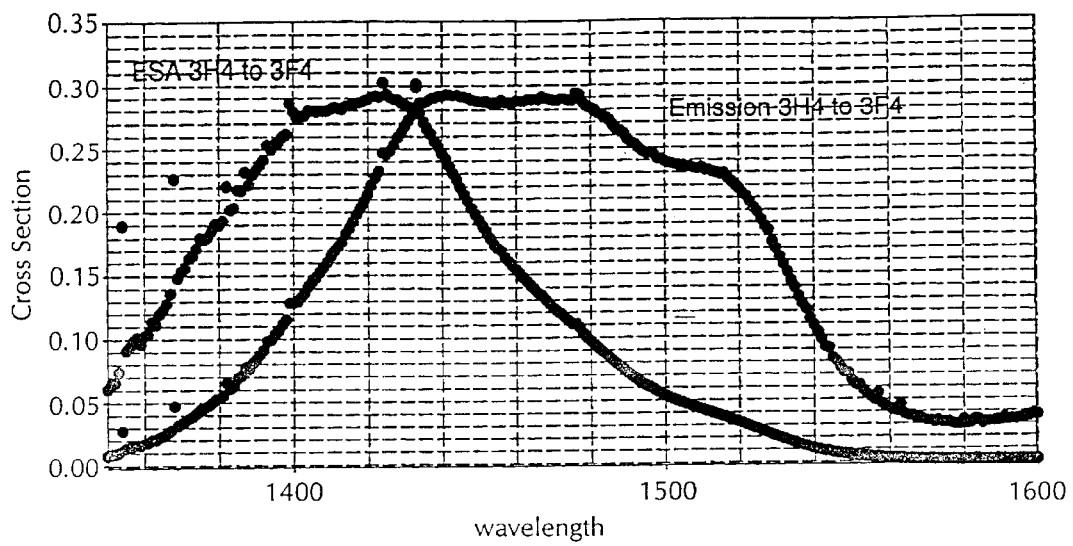
FIG. 9 is a graph comparing the emission cross section from $^3H_4$–$^3F_4$ with the excited state absorption (ESA) process from $^3F_4$–$^3H_4$ for a multi-component germanate glass.

However, rather than reducing the $^3H_4$ level population we propose using the excited state absorption (ESA) process that results from this population of excited ions, to achieve a broad and flat gain spectrum within the 1480–1520 nm wavelength range. The measured cross section for emission from $^3H_4$ to $^3F_4$, along with the excited state absorption process (ESA) from $^3F_4$ to $^3H_4$, is shown in FIG. 9 for a multi-component germanate glass.

We use this host glass only as an example, in particular, because it has a broad fluorescence spectrum. However, our dual pumping scheme will work with any low or intermediate phonon energy glass. Low or intermediate phonon energy glasses are glasses with maximum phonon energies less than 1000 cm$^{-1}$, as measured by europium phonon sideband spectroscopy.

Figure 10:
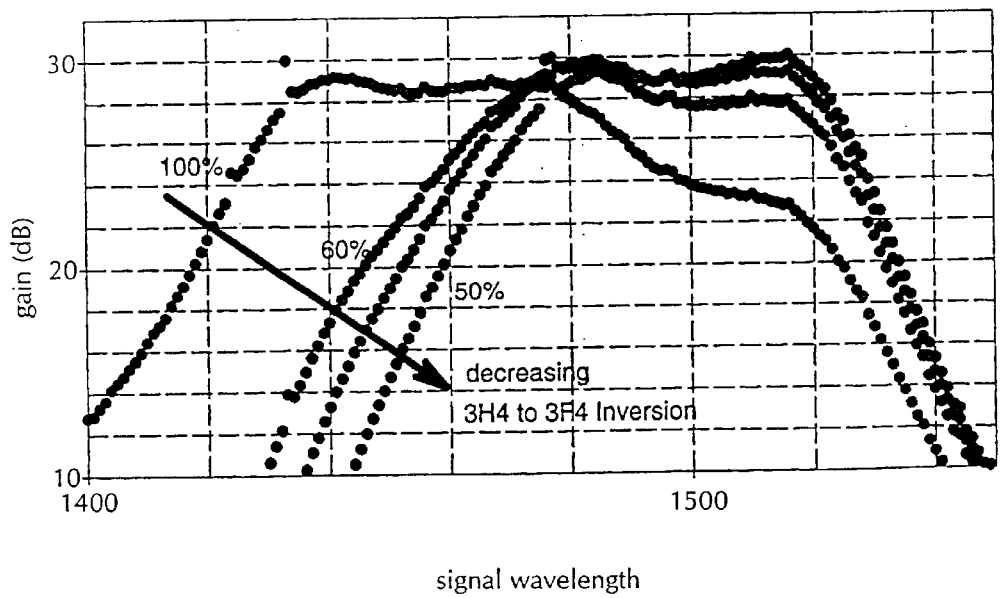
FIG. 10 is a family of curves illustrating the effect of altering the $^3H_4$ to $^3F_4$ population inversion via changes in the second pump power or second pump wavelength in a multi-component germanate glass.

The calculated gain spectrum for a fiber amplifier made from multi-component germanate glass is shown in FIG. 10 for varying degrees of $^3H_4$ to $^3F_4$ population inversion, corresponding to different pumping rates. As illustrated, a relative population inversion around 50% provides a broad flat gain spectrum extending from 1480 to 1520 nm. This is a potentially useful operating wavelength for future WDM systems, being a wavelength range not covered by erbium doped fiber amplifiers. Furthermore this 40 nm wavelength range corresponds to the short wavelength limit of the low loss transmission window in the currently installed long haul fiber base.

Figure 11:
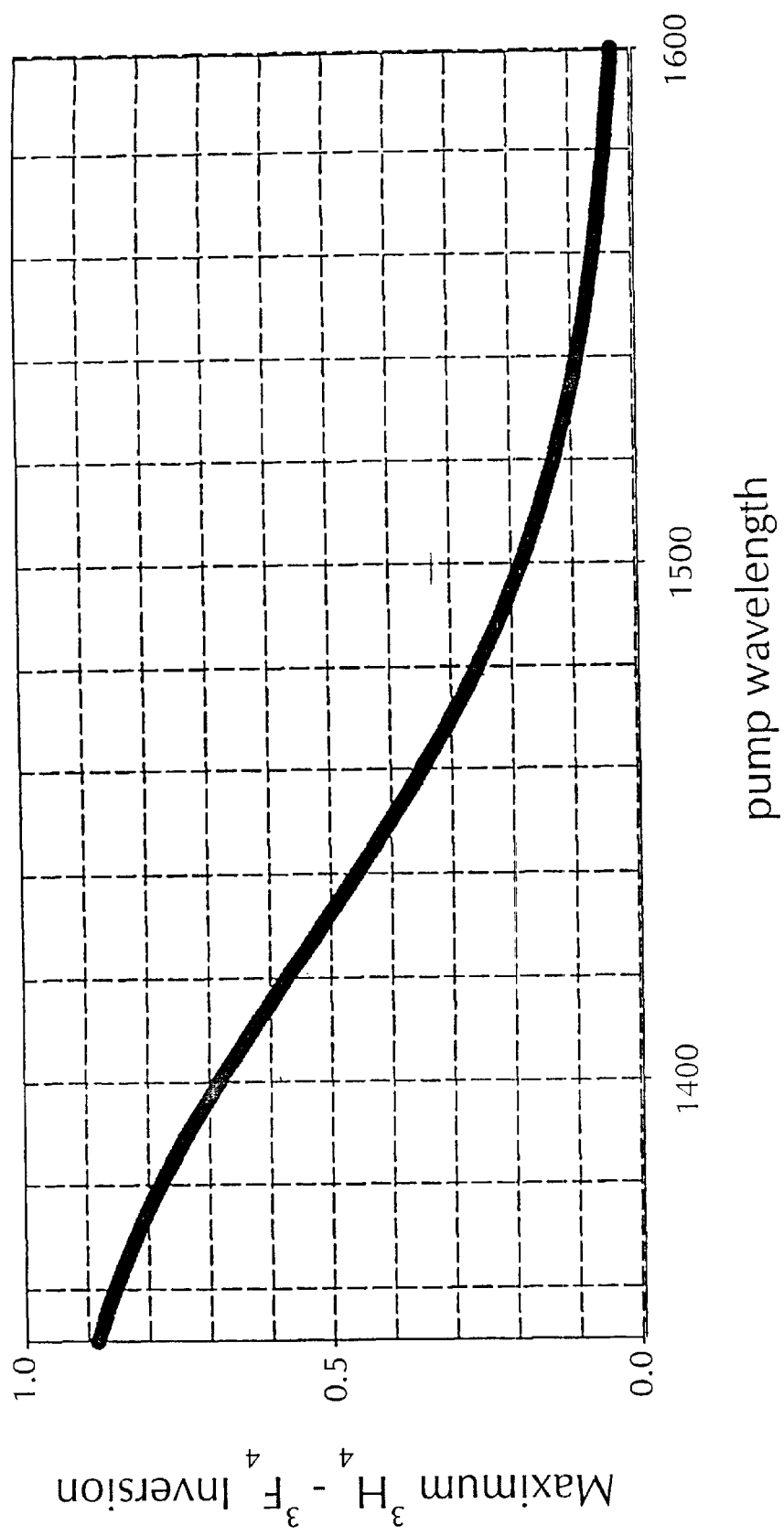
FIG. 11 is a graph illustrating the maximum $^3H_4$–$^3F_4$ inversion as a function of pump wavelength, useful in determining the optimal second pump wavelength in the multi-component germanate glass illustrated in FIG. 10.

The maximum $^3H_4$ to $^3F_4$ population inversion as a function of the second pump wavelength is shown in FIG. 11. The curve indicates that a suitable pump wavelength to achieve 50% inversion is around 1440 nm, a pump wavelength that is readily achieved from current semiconductor laser technology. Alternatively a Raman shifted fiber laser may be used as the source. The primary pump source in our example is 800 nm but alternative wavelengths may be used, including wavelengths around 700 nm ($^3F_3$ level), 1200 nm ($^3H_5$ level), and 1600 nm ($^3F_4$ level). Despite not populating the $^3H_4$ directly, these later two wavelengths do populate the termination $^3F_4$ level from which the second pump laser may populate the metastable $^4H_4$ level.

By changing the relative 1440 nm and 800 nm pump powers, it is possible to make an amplifier with tilt free amplifier functions. The magnitude of the gain (controlled by the primary pump rate at 800 nm) can now be controlled independently of the amplifier gain shape (by adjusting the 1440 nm pump rate). Such a device has numerous potential applications in WDM systems where the changes in amplifier gain shape, brought about adding and dropping channels for example, may be compensated for by simply changing the relative pump rates of the two pump lasers. An alternative dual wavelength-pumping scheme for a thulium doped amplifier is considered in this example. The previous example used a primary pump wavelength that directly excited the thulium ions into the metastable ($^3H_4$) energy level using for example a pump wavelength around 800 nm or 700 nm (where $\Delta\lambda$ is ±50 nm and preferably ±25 nm). However, an alternative scheme using a primary pump wavelength that excites the thulium ions into the termination energy level ($^3F_4$) corresponding to 1560 nm, see FIG. 7 can also be considered. This pump unit (wavelength and/or power) is used to control the total amount of gain within the amplifier by controlling the total number of excited thulium ions. The second pump wavelength, for example at 1460 nm as in the previous case, or 1405 nm (one of the pump wavelengths shown in FIG. 11) is then used to control the relative matastable and termination level populations to hence achieve the optimum gain shape and peak wavelength from the amplifier. That is, varying the second pump's wavelength results in change in relative proportion of ions in matastable and intermediate levels, which results in changes in the gain spectrum (i.e., changes in the gain curve and location). This is shown, for example, in FIG. 10. For the example of a thulium doped amplifier, the primary pump wavelength may be at around 1200 nm, into the $^3H_5$ energy level, from which rapid multiphonon decay occurs relaxing the thulium ions to the termination $^3F_4$ energy level. A second scheme that directly excites the $^3F_4$ level may also be used, in which case the primary pump wavelength would probably be in the wavelength range 1500 nm to 1700 nm. In both these cases the primary pump wavelength and/or power may be varied to control the termination level population, whilst the second pump unit controls the relative populations between the metastable and termination levels.

EXAMPLE 3

Holmium Doped Chalcogenide Amplifier

Figure 12:
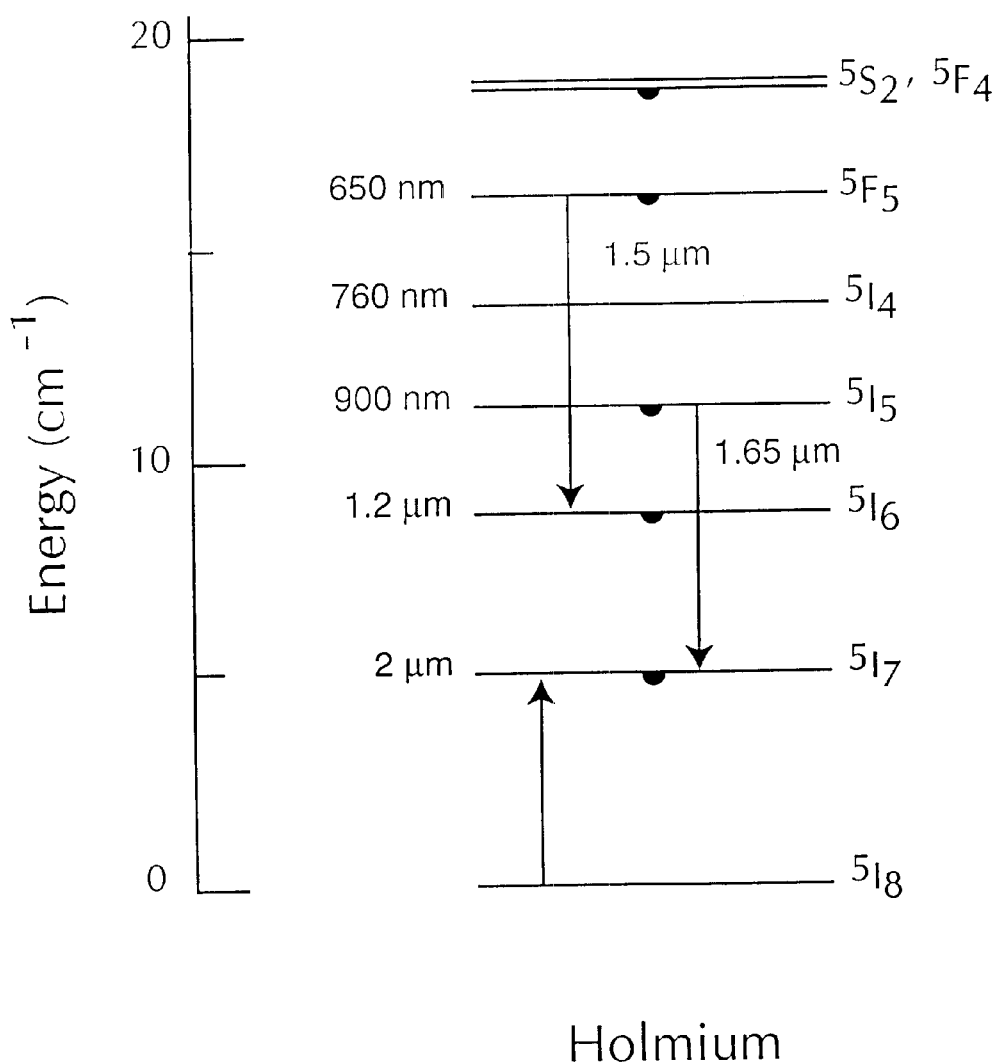
FIG. 12 is an energy level diagram for holmium.
Figure 13:
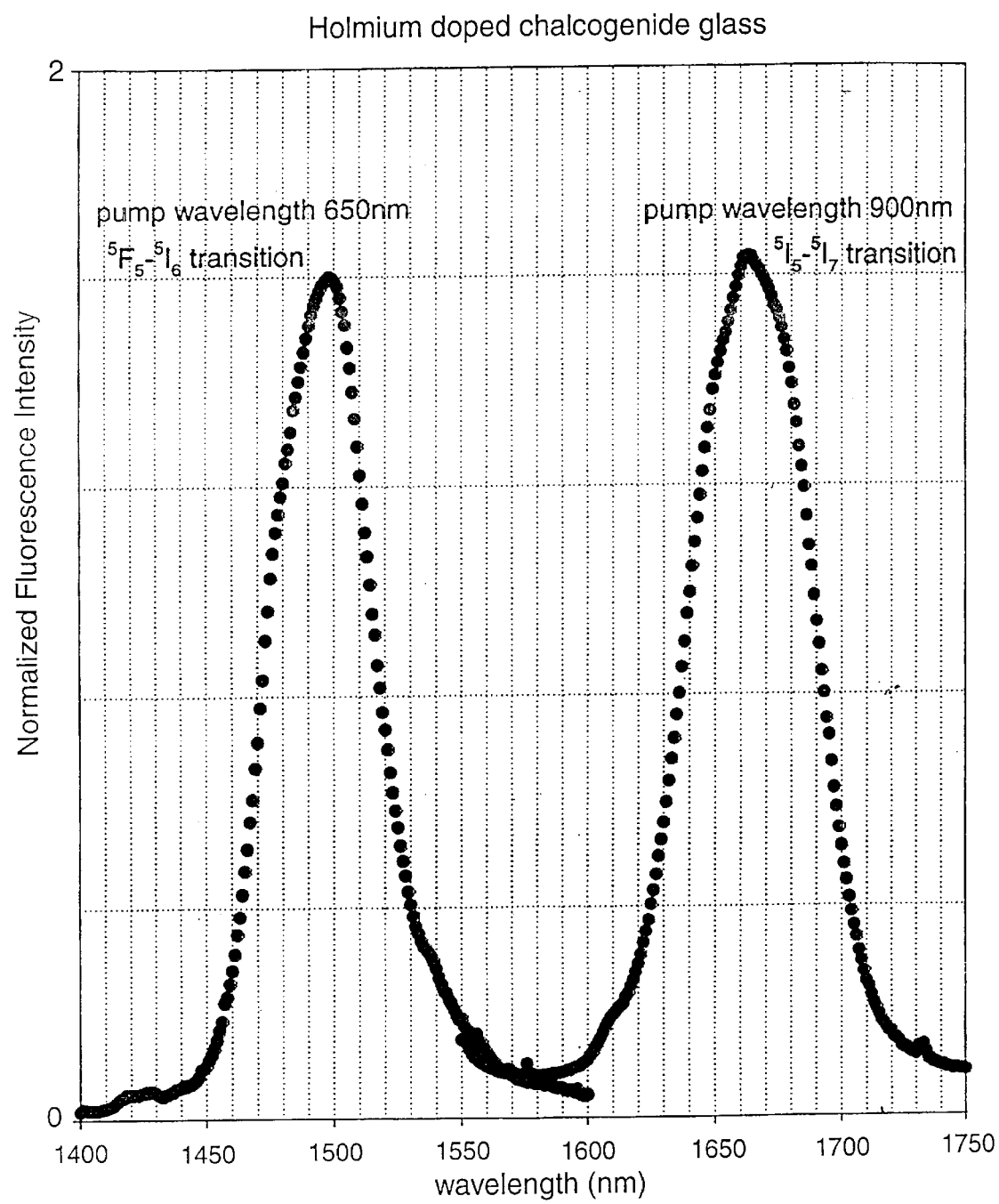
FIG. 13 shows the fluorescence spectrum of holmium doped chalcogenide glass host from the $^5I_5$ energy level to the termination $^5I_7$ level.

The energy level diagram for Holmium is shown in FIG. 12 and the fluorescence spectrum from the $^5I_5$ energy level to the termination $^5I_7$ level is shown in FIG. 13 for a holmium doped chalcogenide glass host. The fluorescence wavelength around 1650 nm potentially has applications in future long haul telecommunications system. The typical fluorescence lifetimes for the metastable and termination levels are around 1.5 miliseconds and 3 milieseconds respectively. Hence the transition is self-terminating and the optical fiber amplifier performance will be adversely affected by a large population of ions present in the $^5I_7$ energy level under single wavelength pumping at 900 nm, for example. The introduction of a second pump wavelength, at around 1600 nm for example to repopulate the metastable level $^5I_5$ and control the termination $^5I_7$ energy level, can significantly improve the amplifier performance. The second pump wavelength and/or power may be altered to control and optimize the amplifier gain spectrum.

In view of the foregoing it will be appreciated that the dual wavelength pump technique of the invention can be used to control termination energy level populations in a variety of different optical materials. The technique is thus useful in implementing a variety of different optical amplifiers. Accordingly, it will be apparent to those skilled in the art that various modifications and adaptations can be made to the present invention without departing from the spirit and scope of this invention. It is intended that the present invention cover the modifications and adaptations of this invention as defined by the appended claims and their equivalence.

What is claimed is:

1. An optical amplifier comprising:
   an optical waveguide having an optical host that contains a rare earth dopant, said host and dopant defining a ground energy state;
   a first pump that supplies optical energy into said waveguide at a first wavelength to establish a metastable energy state above said ground energy state said first pump being optically coupled to said waveguide;
   an input coupled to said optical waveguide, said input introducing an optical signal to be amplified, amplification is produced by stimulated emission of photons from said metastable energy state thereby establishing a termination energy state below said first metastable energy state and above said ground energy state;
   a second pump optically coupled to said waveguide that supplies optical energy to said waveguide at a second wavelength and operates to repopulate said first metastable energy state by depopulating said termination energy state; and
   a pump control mechanism coupled to at least one of said first pump and said second pump and operable to control the power or wavelength associated with at least one of said first pump and said second pump, thereby altering the amplifier gain spectrum associated with the optical amplifier.

2. The optical amplifier of claim 1 wherein said host is a low to intermediate phonon energy glass with maximum phonon energy less than 1000 $cm^{-1}$.

3. The optical amplifier of claim 1 wherein said optical waveguide is a Praseodymium doped chalcogenide glass fiber.

4. The optical amplifier of claim 1 wherein said metastable energy state is the $^1G_4$ energy level with a fluorescence lifetime greater than 100 $\mu$sec.

5. The optical amplifier of claim 1 wherein said first wavelength is a predetermined wavelength of about 1020 nanometers.

6. The optical amplifier of claim 1 wherein said termination state is the $^3H_5$ energy level.

7. The optical amplifier of claim 1 wherein said second wavelength is a predetermined wavelength of about 1280 nanometers.

8. The optical amplifier of claim 1 wherein the transition from said metastable energy state to said termination energy state corresponds to an amplified signal wavelength in the 1.3 micron band.

9. The optical amplifier of claim 1 wherein at least one of said first and second pumps is a semiconductor laser.

10. The optical amplifier of claim 1 wherein said optical waveguide is a Thulium doped low to intermediate phonon energy glass with maximum phonon energy less than 1000 $cm^{-1}$.

11. The optical amplifier of claim 10 wherein said metastable energy state is the $^3H_4$ energy level with a fluorescence lifetime greater than 50 $\mu$sec.

12. The optical amplifier of claim 10 wherein said first wavelength is a predetermined wavelength of around 700, 800, 1060 or 1200 nanometers.

13. The optical amplifier of claim 10 wherein said termination energy state is the $^3F_4$ energy level.

14. The optical amplifier of claim 10 wherein said second wavelength is a predetermined wavelength of about 1440 nanometers.

15. The optical amplifier of claim 10 where the glass host is any one of: germanate, aluminate, tellurite, halide, gallate or chalcogenide glasses.

16. The optical amplifier of claim 1 where the waveguide is a holmium doped chalcogenide glass.

17. The optical amplifier of claim 16 where the amplifier operates at a wavelength around 1650 nm on the $^5I_5-^5I_7$ transition.

18. The optical amplifier of claim 16 where the amplifier is pumped is pumped at two different wavelengths one from the list around 650, 760, 900, 1200, 1800 nm, the second at a wavelength around 1500 nm to control the relative metastable and termination level populations.

19. An optical amplifier comprising:
   an optical waveguide having a glass host that contains a rare earth dopant, said host and dopant defining a ground energy state;
   a first pump optically coupled to said waveguide, said pump supplying optical energy into said waveguide at a first wavelength to establish a termination energy state above said ground energy state;
   a second pump optically coupled to said waveguide, said second pump supplying optical energy into said waveguide at a second wavelength to establish a metastable energy state above said termination energy state;
   an input coupled to said optical waveguide for introducing an optical signal to be amplified whereby amplification is produced by stimulated emission of photons from said metastable energy state to said termination energy state; wherein said second pump supplies optical energy to said waveguide at said second wavelength and operates to repopulate said first metastable energy state by depopulating said termination energy state; and
   a pump control mechanism coupled to at least one of said first pump and said second pump and operable to control the power or wavelength associated with at least one of said first pump and said second pump, thereby altering the shape of an amplifier gain spectrum associated with the optical amplifier.

20. The optical amplifier of claim 19, wherein said second wavelength is about 1405 nm.

21. The optical amplifier according to claim 20, wherein said termination energy state is the $^3F_4$ energy state.

22. The optical amplifier according to claim 20, wherein said first wavelength is about 1560 nm.

23. The optical amplifier of claim 1 wherein the pump control mechanism is coupled to said second pump and operable to increase the power of the optical energy supplied to said waveguide by said second pump in relation to the power of the optical energy supplied to said waveguide by said first pump, thereby shifting the peak operating wavelength of the amplifier gain spectrum towards longer wavelengths.

24. The optical amplifier of claim 19 wherein the pump control mechanism is coupled to said first pump and operable to increase the power of the optical energy supplied to said waveguide by said first pump in relation to the power of the optical energy supplied to said waveguide by said second pump, thereby shifting the peak operating wavelength of the amplifier gain spectrum towards longer wavelengths.

25. A method for controlling the amplifier gain spectrum associated with an optical amplifier, comprising:
   providing an optical waveguide having an optical host that contains a rare earth dopant, such that the host and the dopant define a ground energy state;
   supplying optical energy into said waveguide at a first wavelength using a first pump, thereby establishing a metastable energy state above said ground energy state;

introducing an optical signal to be amplified into said optical waveguide, such that amplification is produced by stimulated emission of photons from said metastable energy state thereby establishing a termination energy state below said first metastable energy state and above said ground energy state;

supplying optical energy to said waveguide at a second wavelength using a second pump, thereby repopulating said first metastable energy state by depopulating said termination energy state; and altering at least one of the power or the wavelength of the optical energy supplied by said second pump, thereby controlling the amplifier gain spectrum associated with the optical amplifier.

26. The method of claim 25 further comprising the step of increasing the power of the optical energy supplied to said waveguide by said second pump in relation to the power of the optical energy supplied by said first pump, thereby shifting the peak operating wavelength of the amplifier gain spectrum towards longer wavelengths.

27. The method of claim 25 further comprising the step of changing a ratio of the power of the optical energy supplied by said first pump with the power of the optical energy supplied by said second pump, thereby altering a magnitude associated with the amplifier gain spectrum.

28. A method for controlling the amplifier gain spectrum associated with an optical amplifier, comprising:

providing an optical waveguide having a glass host that contains a rare earth dopant, such that the host and the dopant define a ground energy state;

supplying optical energy into said optical waveguide at a first wavelength using a first pump, thereby establishing a termination energy state above said ground energy state;

supplying optical energy into said optical waveguide at a second wavelength using a second pump, thereby establishing a metastable energy state above said termination energy state;

introducing an optical signal to be amplified into said optical waveguide, such that amplification is produced by stimulated emission of photons from said metastable energy state to said termination energy state; and altering at least one of the power or the wavelength of the optical energy supplied by said first pump, thereby controlling the amplifier gain spectrum associated with the optical amplifier.

29. The method of claim 28 further comprising the step of increasing the power of the optical energy supplied to said waveguide by said second pump in relation to the power of the optical energy supplied by said first pump, thereby shifting the peak operating wavelength of the amplifier gain spectrum towards longer wavelengths.

30. The method of claim 28 further comprising the step of changing a ratio of the power of the optical energy supplied by said first pump with the power of the optical energy supplied by said second pump, thereby altering the magnitude associated with the amplifier gain spectrum.

* * * * *